United States Patent
Nelson et al.

(10) Patent No.: US 7,280,028 B2
(45) Date of Patent: Oct. 9, 2007

(54) TEMPERATURE SENSOR AND METHOD OF MAKING THE SAME

(75) Inventors: Charles Scott Nelson, Clio, MI (US); Paul Casey Kikuchi, Fenton, MI (US); James Paul Vargo, Swartz Creek, MI (US); Douglas James Behrendt, Linden, MI (US); Walter T. Symons, Grand Blanc, MI (US); William J. LaBarge, Bay City, MI (US); Kaius K. Polikarpus, Grand Blanc, MI (US); Rick D. Kerr, Fenton, MI (US); Jinping Zhang, Grand Blanc, MI (US); Paul R. Daniel, Jr., Burton, MI (US)

(73) Assignee: Delphi Technologies, Inc., Troy, MI (US)

( * ) Notice: Subject to any disclaimer, the term of this patent is extended or adjusted under 35 U.S.C. 154(b) by 451 days.

(21) Appl. No.: 10/803,556

(22) Filed: Mar. 17, 2004

(65) Prior Publication Data

US 2004/0202227 A1 Oct. 14, 2004

Related U.S. Application Data

(63) Continuation-in-part of application No. 10/004,679, filed on Dec. 4, 2001, now abandoned.

(51) Int. Cl.
*H01C 7/10* (2006.01)
*H01C 7/13* (2006.01)

(52) U.S. Cl. .................. 338/22 R; 338/25; 338/256; 73/53.01

(58) Field of Classification Search .............. 338/22 R, 338/25, 256–257, 262, 269, 275, 293, 314; 73/53.01, 53.06

See application file for complete search history.

(56) References Cited

U.S. PATENT DOCUMENTS

| 4,310,574 A | 1/1982 | Deadmore et al. ............ 427/405 |
| 4,332,081 A | 6/1982 | Francis ......................... 29/612 |
| 4,824,550 A | 4/1989 | Ker et al. ...................... 204/427 |
| 4,881,057 A | 11/1989 | Garcia et al. .................. 338/28 |
| 4,907,341 A | 3/1990 | Chapel, Jr. et al. ............ 29/612 |
| 5,430,428 A | 7/1995 | Gerblinger et al. ............ 338/25 |
| 5,573,650 A | 11/1996 | Fukaya et al. ................ 204/424 |
| 5,804,050 A | 9/1998 | Hayakawa et al. ........... 204/424 |
| 6,267,857 B1 | 7/2001 | Akatsuka et al. ............. 204/424 |
| 6,634,210 B1 | 10/2003 | Bosch et al. .................. 73/23.33 |
| 6,862,919 B2 * | 3/2005 | Lin et al. ...................... 73/53.01 |
| 2003/0033858 A1 | 2/2003 | Lambert et al. ............... 73/53.01 |

* cited by examiner

*Primary Examiner*—Richard K. Lee
(74) *Attorney, Agent, or Firm*—Paul L. Marshall

(57) ABSTRACT

A method for manufacturing a planar sensor, comprises disposing a film of a material on a substrate, wherein the material is selected from the group consisting of platinum, rhodium, palladium and mixtures and alloys comprising at least one of the foregoing materials; annealing the material; measuring a resistance value of the material; laser trimming the annealed material; heat treating the laser trimmed material; and laser trimming the heat treated material to form the sensor.

3 Claims, 4 Drawing Sheets

TEMPERATURE SENSOR AND METHOD OF MAKING THE SAME

CROSS REFERENCE TO RELATED APPLICATION

The present application is a continuation-in-part application of U.S. patent application Ser. No. 10/004,679, filed Dec. 4, 2001, now abandoned which is hereby incorporated by reference in its entirety.

BACKGROUND

Increased demand for improved fuel economy and emissions control has necessitated the development of emission remediation systems capable of reducing harmful exhaust constituents over a wide range of air/fuel mixtures in both fuel-rich and fuel-lean conditions. Stricter emission regulations have lead to the use of chemical elements that cannot be exposed to the high exhaust temperatures exhibited in the past, e.g., greater than 900° C. Exhaust remediation components used in automotive exhaust environment are increasingly susceptible to failure at temperatures exceeding about 700° C. Temperature sensors are frequently being incorporated into exhaust systems such that measures to reduce exhaust temperatures can be initiated to protect these new emission components. Faster light-off time for these temperature sensors (time to activity) is important for emissions control, as high temperature excursions are at the most frequent levels at startup.

Planar temperature sensors are used in a wide variety of applications across many different disciplines. In automotive applications, the resistance values of the planar temperature sensors are generally greater than or equal to about 200 ohms, which is achieved by creating an elongated narrow ribbon of sensing element material having certain resistance characteristics. Where planar temperature sensors are intended to be used in high temperature environments, i.e., environments where temperatures are often above 500° C., they are traditionally manufactured using extremely precisely controlled thin film depositing and etching techniques. In order to ensure that the elongated sensor trace of the planar temperature sensor has a resistance above about 200 ohms, the length, width, and thickness of the sensing electrode are generally tightly controlled. Although such temperature sensors can be produced with thin film and etching method, it is expensive and troublesome with respect to the extremely precise control generally employed with these techniques.

Additionally, it is noted at temperatures greater than or equal to 600° C., the temperature sensing element material may experience grain growth and/or pore coalescence/nucleation, which can cause changes in the circuit resistance. For example, a temperature sensor failure, which may be referred to as a "hard" sensor failure by those of skill in the art, may occur due to the opening of the resistive circuit as a result of voids (pore) growth in the sensing electrodes. Further, a sensor failure, referred to as a "soft" sensor failure by those of skill in the art, may be observed as resistance drift of the sensing electrodes due to the loss of the resistive circuit cross-sectional area.

Temperature sensors used in automotive exhaust environment are increasingly exposed to alkali metal oxides such as $K_2O$ and $BaO$ and acidic oxides such as $V_2O_5$, $WO_3$, and $MoO_3$. These materials are particularly troubling to temperature sensors, since the materials can easily migrate through temperature sensor protective coatings and significantly change the resistance of the sensing electrode.

Further, temperature sensors used in automotive exhaust environment, including diesel exhaust, are increasingly exposed to steam, hydrogen, and carbon monoxide. Steam, hydrogen, and carbon monoxide are particularly troubling to temperature sensors since these gas phase materials can migrate through temperature sensor protective coatings and cause vaporization of the sensing electrode, scaling, and de-adhesion of sensing electrodes, and failure of the protective coatings.

It is also noted that sensing electrodes are highly permeable to oxygen. Permeability to oxygen at high temperature can accelerate the coalescence of grain boundaries and the sintering of sensing electrodes. Addition of coatings such as high temperature glasses has enhanced barrier properties to the migration of oxygen. Unfortunately, coatings such as glasses do not inhibit oxygen migration enough to stabilize the electrodes for the length of time desired for durability.

Therefore, what is needed in the art are improved methods of stabilizing a temperature sensing element, and temperature sensors that inhibits grain growth and pore coalescence/nucleation in the sensing element material.

SUMMARY

One embodiment of a method for manufacturing a planar sensor, comprises disposing a film of a material on a substrate, wherein the material is selected from the group consisting of platinum, rhodium, palladium and mixtures and alloys comprising at least one of the foregoing materials; annealing the material; measuring a resistance value of the material; laser trimming the annealed material; heat treating the laser trimmed material; and laser trimming the heat treated material to form the sensor.

A second embodiment of a method for manufacturing a planar temperature sensor, the method comprises disposing a film of material having a material thermal coefficient of resistance of greater than or about 800 parts per million, on a substrate; measuring a resistance value of the material; setting a laser trimming device to ablate material consistent with achieving the inputted resistance value; ablating greater than or equal to about 50 mm of the material to form the sensor.

A third embodiment of a method for manufacturing a planar temperature sensor, the method comprises disposing a material having a thermal coefficient of resistance of greater than about 800 parts per million, on a substrate; measuring a resistance value of the material; setting a laser trimming device to ablate material consistent with achieving the inputted resistance value; and ablating greater than or equal to about 50 mm of the material.

A fourth embodiment of a method for manufacturing a planar temperature sensor, the method comprises disposing a material having a thermal coefficient of resistance of greater than about 800 parts per million, wherein the substrate has a single film thereon; measuring a resistance value of the material; setting a laser trimming device to ablate material consistent with achieving the inputted resistance value; and ablating the material to form the sensor A fifth embodiment a method of making a planar temperature sensor, the method comprises disposing a material on a substrate, wherein the material is selected from the group consisting of platinum, rhodium, palladium, gold, and mixtures and alloys comprising at least one of the foregoing materials; annealing the material; and vaporizing a portion of the material to form a sensing element on the substrate;

vaporizing a portion of the substrate; and depositing the vaporized substrate material on the sensing element to form a protective coating.

A sixth embodiment of a method of making a planar temperature sensor, the method comprises disposing a material on a substrate, wherein the material is selected from the group consisting of platinum, rhodium, palladium, gold, and mixtures and alloys comprising at least one of the foregoing materials; annealing the material; and vaporizing a portion of the material to form a sensing element on the substrate; vaporizing a secondary target material; and depositing the vaporized secondary target material on the sensing element to form a protective coating.

An embodiment of a planar temperature sensor comprises a substrate; a sensing material disposed on the substrate, wherein the sensing material is selected from the group consisting of platinum, rhodium, palladium and mixtures and alloys comprising at least one of the foregoing materials; a protective coating disposed on at least a portion of the sensing material, wherein the protective coating comprises an aluminide or silicide of the sensing material.

The above-described and other features will be appreciated and understood by those skilled in the art from the following detailed description, drawings, and appended claims.

DRAWINGS

Refer now to the figures, which are exemplary embodiments and wherein like elements are numbered alike.

DETAILED DESCRIPTION

This disclosure relates to temperature sensors and methods of making the same. Particularly discussed are planar resistance temperature detectors (RTD) for use at high temperatures, i.e., temperatures greater than or equal to about 600° C. By way of example, a rectangular temperature sensor is depicted in the figures that are described herein. However, the shape of the sensor may be any geometric shape or combination of geometric shapes and need not be rectangular to fall within the scope of the instant disclosure and the scope of the appended claims. It should also be noted, that although described in relation to sensing exhaust gas temperatures, e.g., for automotive applications, the temperature sensor can be applied in various areas desiring temperature sensing, including aerospace, industrial (e.g., in furnaces, flues, and the like), and elsewhere. Further, it should be noted that this disclosure could readily be adapted for use in devices other than a temperature sensor, e.g., a heating element and/or ground plane in a gas sensor. It should further be noted that the terms "first," "second," and the like herein do not denote any order or importance, but rather are used to distinguish one element from another, and the terms "a" and "an" herein do not denote a limitation of quantity, but rather denote the presence of at least one of the referenced item. Furthermore, all ranges disclosed herein are inclusive and combinable (e.g., ranges of "up to about 25 wt. %, with about 5 wt. % to about 20 wt. % desired, and about 10 wt. % to about 15 wt. % more desired," is inclusive of the endpoints and all intermediate values of the ranges, e.g., "about 5 wt. % to about 25 wt. %, about 5 wt. % to about 15 wt. %" etc.).

Figure 1:
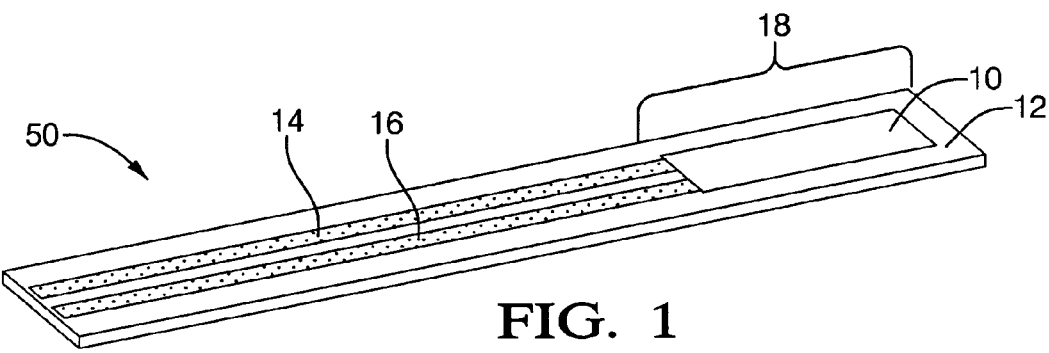
FIG. 1 is a perspective schematic representation of one embodiment of a temperature sensor.

Furthermore, it is noted that various temperature sensors can have similar structural elements to each other. As such, an exemplary temperature sensor is shown in FIG. 1 to illustrate the common elements of a temperature sensor. However, distinct features of each embodiment will be discussed in greater detail when such embodiments are first introduced.

Figure 2:
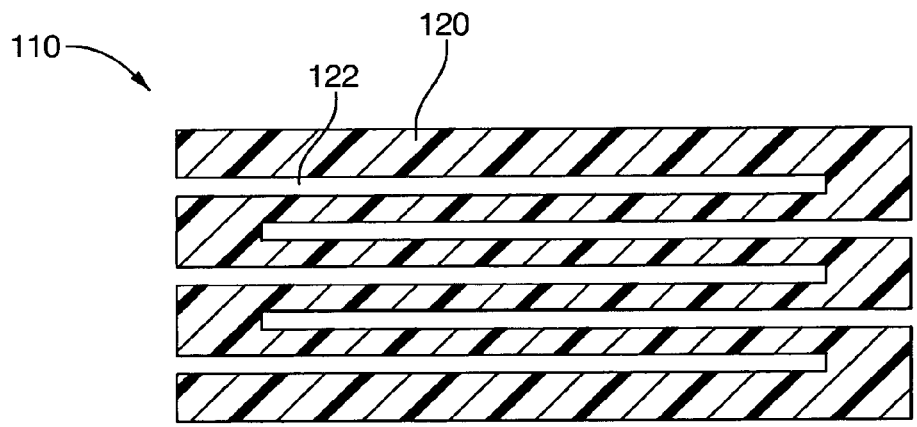
FIG. 2 is a perspective schematic representation of the sensing element of FIG. 1 after trimming.

Referring now to FIG. 1, an exemplary temperature sensor generally designated 50 is illustrated. The temperature sensor 50 comprises a sensing element 10 disposed on a substrate 12. Leads 14 and 16 are disposed on the substrate 12 and are in electrical communication with sensing element 10. Generally, the temperature sensor 50 comprises a sensing end 18 that comprises sensing element 10. As will be discussed in greater detail, the sensing element 10 may be disposed on substrate 12 as a pad (shown in FIG. 1). The pad and substrate 12 may later be laser trimmed for ablative removal of the sensing element to reduce the sensing element cross-sectional area and obtain a desired resistance circuit (FIG. 2, sensing element 110).

The sensing element pattern may be repeated over the substrate such that many separate temperature sensing circuits may be formed on a single substrate. After completion of the laser trimming, the substrate may be laser scribed and divided up into individual temperature sensors.

Suitable methods of depositing a thin film of sensing element material upon a fired substrate include, but are not limited to, sputtering physical vapor deposition, pulsed laser physical vapor deposition, plasma-enhanced physical vapor deposition, molecular beam epitaxy (thermal deposition), physical vapor deposition, chemical vapor deposition, plasma-enhanced chemical vapor deposition, laser-assisted chemical vapor deposition, partially ionized beam deposition, and the like.

Preferably, a vapor phase deposition of precious metal oxides, such as sputtering an alloy target or co-sputtering two or more pure targets, is used to deposit the sensing element material. The energy supplied for vaporization/atomization can be, for example, direct current (DC) or radio frequency (RF). The deposition process may be carried out in air or in an artificial atmosphere containing oxygen, under cover of an inert gas such as argon (Ar), neon (Ne), krypton (Kr), xenon (Xe), nitrogen ($N_2$), or mixtures comprising at least one of the foregoing or under cover of a reactive gas such as oxygen ($O_2$), ozone ($O_3$), nitrous oxide ($N_2O$) and/or ammonia ($NH_3$). For example, the atmosphere may include a gas mixture such as $O_2$+He+Xe, $O_2$+Ne+Xe, and the like.

The sensing element substrate may have a negative voltage bias upon it. A vapor sensing element material source may generate positive charged species, and those charged species may be accelerated towards and deposited upon the negatively biased sensing element substrate. As such the amount of bias determines the acceleration of the ionic radicals towards the biased substrate. The bias is sufficient to attract and deposit the charged species from the sensing element target onto the substrate. For example, the bias may be about −600 V (volts) to about −1 V, with a bias of about −10 V to about −400 V preferred, with a voltage of about −100 V to about −300 V more preferred.

Preferably, the sensing element is deposited as an oxide (e.g., an oxide film) and reduced to the metallic state. The films can be annealed, e.g., heated to a sufficient temperature and for a sufficient time to decompose the metal oxide to the metallic state. For example, the film(s) can be thermal annealed, rapid thermal annealed, laser annealed and/or electron beam annealed. Preferably, the films are annealed at a temperature of about 450° C. to about 1,150° C., with a temperature of about 550° C. to about 1,050° C. preferred. In an exemplary embodiment, the sensing element comprises about 1 atomic percent (at. %) to about 99 at. % platinum, with greater than or equal to about 80 at. % preferred.

Suitable deposition methods of depositing a thick film of sensing element material upon a substrate include, but are not limited to, screen printing, stenciling, dip coating, plating, and the like. If a co-firing process is employed for the formation of the sensor, screen-printing the electrodes onto appropriate tapes (e.g., green or un-fired substrates) is preferred due to simplicity, economy, and compatibility with the co-fired process. Preferably, precious metals are formed into a paste, screen printed onto a substrate and dried. The metals may be combined with a binder, and a solvent to make the paste. Once the paste is applied to the substrate, dried, and annealed onto the substrate, each sensing electrode has a sufficient thickness to form the desired sensing element after laser ablation, e.g., a thickness of about 5 micrometers to about 50 micrometers.

An embodiment of a trimmed sensing element 110 is illustrated in FIG. 2. Generally, the sensing element 110 comprises a margin(s) 120 and a trimmed portion 122. The trimmed portion 122 may comprise any pattern, e.g., a serpentine pattern (illustrated in FIG. 2), a spiral pattern, and the like. The ablated pathway between the serpentine sensing element can be separated by about 1 micrometer to about 1,000 micrometers. As such, in an exemplary embodiment, the ablated pathways through the sensing element are preferably about 20 micrometers to about 100 micrometers.

Various sensing elements materials have a range of thermal coefficient of resistivity (TCR) values. The TCR, which is generally measured in parts per million per degree temperature, is characterized by an increase in resistance for each degree increase of temperature over a given range. Materials having the highest TCR are preferred such that a greater change in resistance per degree temperature can be realized compared to lower TCR values. The sensing element material preferably has a high thermal coefficient of resistance, i.e., greater than or equal to about 800 parts per million per degree Celsius (ppm/° C.), with greater than or equal to about 1,500 ppm/° C. preferred, greater than or equal to about 2,500 ppm/° C. more preferred, and greater than or equal to about 3,000 ppm/° C. even more preferred. The sensing element material also preferably has a high natural resistivity (i.e., greater than or equal to about 5 micro-ohm-centimeters); is stable at high temperatures (i.e., greater than or equal to about 600° C.); and exhibits stability over time at high temperatures (e.g., for greater than or equal to about 100 hours at about 950° C.). Suitable sensing element materials include, but are not limited to, metals and oxides of platinum, rhodium, palladium, iridium, ruthenium, gold, and mixtures and alloys comprising at least one of the foregoing materials. Preferably, the sensing element material comprises platinum, which has a TCR of about 3,928 ppm/° C. It is noted that leads 14 and 16 may comprise similar materials as the sensing element, and/or silver, nickel, and chromium The substrate 12 may be a ceramic material capable of withstanding the operating temperatures in which the sensor will be employed and, preferably, a resistance of greater than or equal to about 100,000 ohms at 1,000° C. to reduce the possible sensor error. More particularly, if the resistivity of the substrate is lower than about 100,000 ohms at 1,000° C., electronic noise can cause the temperature sensor to report significantly erroneous sensor outputs.

In various embodiments, the substrate 12 comprises aluminum oxide ($Al_2O_3$), silicon oxide ($SiO_2$), titanium oxide ($TiO_2$), zirconium oxide ($ZrO_2$), or a combination comprising at least one of the foregoing, as well as other dielectric materials. Additionally, the substrate may comprise mixed oxides such as mullite ($3Al_2O_3$—$2SiO_2$), lanthanum aluminate ($LaAlO_3$), zirconium-aluminum oxide ($ZrO_2$—$Al_2O_3$), yttrium-zirconium-aluminum oxide ($Y_2O_3$—$ZrO_2$—$Al_2O_3$), fused silica ($SiO_2$), barium titanate ($BaTiO_3$), strontium titanate ($SrTiO_3$), aluminum-titanium oxide glass composition, cordierite-glass composition, lithium-alumina-silica ($Li_2O$—$Al_2O_3$—$SiO_2$), magnesium-aluminum-silicon oxide ($MgO$—$Al_2O_3$—$SiO_2$), sodium-aluminum-silicon ($Na_2O$—$Al_2O_3$—$SiO_2$), barium-aluminum-silicon ($BaO$—$Al_2O_3$—$SiO_2$), lithium-magnesium-aluminum-silicon ($Li_2O$—$MgO$—$Al_2O_3$—$SiO_2$), potassium-magnesium-aluminum-silicon ($K_2O$—$MgO$—$Al_2O_3$—$SiO_2$), and the like.

A glass frit may also be added to the substrate as a sintering aid for densifying alumina materials. The glass frit preferably comprises a Group II element including magnesium oxide, calcium oxide, barium oxide, and/or strontium oxide. Glass frit sintering aids also include minerals such as clays, talc, dolomite, steatite, fluorspar, kaolin, mullite, borax, spodumene, wollastonite, borides, carbides, carbonates, phosphates, borates, sulfates, and the like, as well as combinations comprising at least one of any of the foregoing minerals. Preferably, the substrate 12 comprises about 86 wt. % to about 99.5 wt. % aluminum oxide, and 0 wt. % to about 4 wt. % silicon oxide, wherein the weight percent is based on a total weight of the sintered substrate. It is noted that when the primarily aluminum oxide substrate is sintered, silicon oxide is excluded from the dense alpha-alumina phase and concentrates at the substrate surface. For example, a substrate comprises 94 wt. % alpha-alumina, 2 wt. % silica and 4 wt. % frit, fired to a densification temperature above about 1500° C., has a surface concentration above 40 wt. % silica for the first 20 nanometers (nm) depth, wherein the weight percents are based on a total weight of the sintered substrate.

The substrate may be formed by any suitable process, e.g., die pressing, roll compaction, tape casting techniques, and the like. The substrate preferably has a thickness sufficient to provide mechanical strength to the temperature sensor and support the sensing element material. For example, the substrate 12 can have a thickness of about 50 micrometers to about 2,000 micrometers. In various embodiments the substrate can have a thickness of about 50 micrometers to about 800 micrometers, with a thickness of about 150 micrometers to about 450 micrometers preferred, and a thickness of about 250 micrometers to about 350 micrometers more preferred. Preferably, the substrate is made from tape-cast layers that have been laminated at a temperature, pressure, and for a period of time sufficient to bond the various layers together and to eliminate any void spaces therebetween. For example, a pre-fired substrate may be isostatically laminated for about 1 minute to about 30 minutes, at temperatures of about 25° C. to about 125° C. and at pressures of about 400 pounds per square inch (psi) (about 2,758 kPa) to about 4,500 psi (31,026 kPa). The substrate 12 is preferably fired to densification, i.e., heated to a temperature to remove organics to less than about 1 wt. %, based on the total weight of the sintered substrate.

It is noted that the sensing element material of the fired sensor has a resistivity, e.g., a resistivity of about 2 ohms to about 3 ohms at 25° C., prior to further processing. For a sensor element material having a thickness of about 2 micrometers to about 7 micrometers a desired resistance in the annealed sensor element 10 is greater than or equal to about 100 ohms at 0° C. (e.g., about 100 ohms to about 1,100 ohms at 0° C.), with a resistance of greater than or equal to about 200 ohms at 0° C. preferred (e.g., about 200 ohms to about 500 ohms at 25° C. preferred) for automotive type applications. The resistance value depends on the final use and the desired signal to noise ratio of the system. For example, such relatively high resistance values (e.g., around 200 ohms) in the temperature sensor are preferred for use in automotive systems due to other sources of resistance including wires, connections, and the like, to reduce errors caused by contributions to the overall resistance measured.

Figure 3:
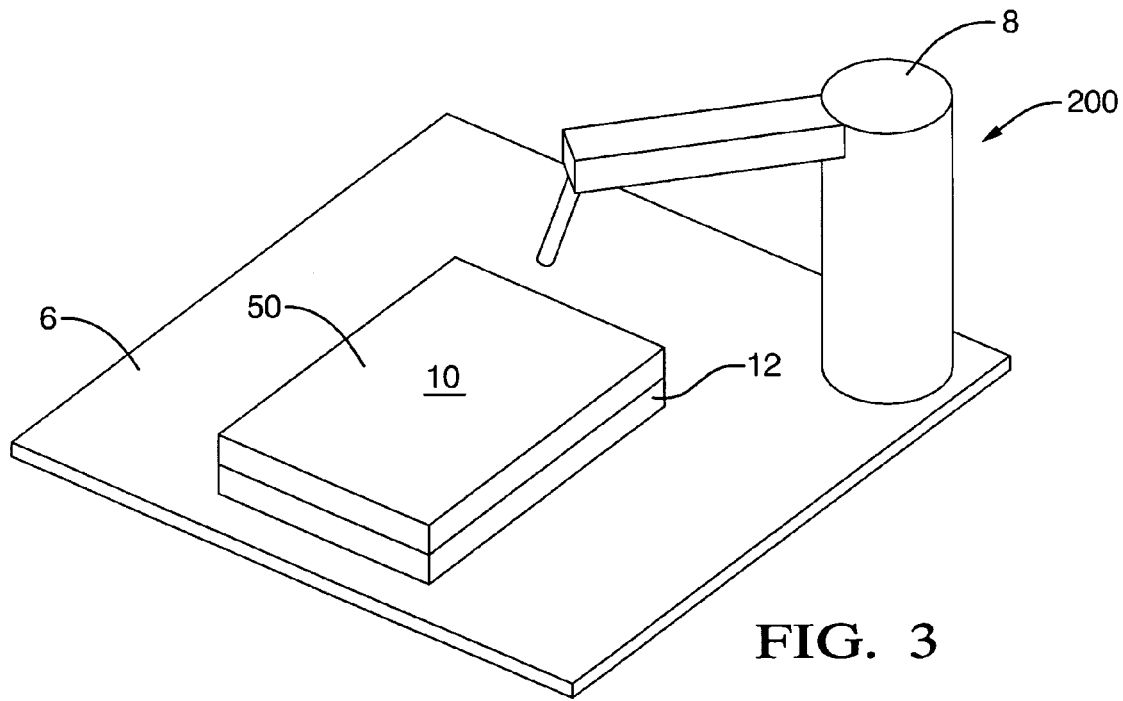
FIG. 3 is a perspective schematic representation illustrating a temperature sensor in a laser trimming device.

Referring now to FIG. 3, one possible method of forming the sensing element 110 comprises mounting temperature sensor assembly 50 (substrate 12 with sensing element material disposed thereon) to a fixture 6 in a trimming device 200. The trimming device can form a pathway through the sensing element material such that the pathway exposes the substrate and/or is cut into the substrate. For example, the trimming device can vaporize a pathway through the sensing element as well as into the substrate. The slot can be a portion of the way through the substrate as well as fully through the substrate by vaporization of the substrate. Lasers are particularly attractive as the trimming device because a large amount of energy can be focused on a very small area and manipulation of the laser operating parameters allows controlling of the melt depth. Suitable laser devices for ablation of the sensing element and substrate include Nd:YAG laser, $CO_2$ laser and high-powered diode laser. The laser may be a continuous wave or pulsed laser. Preferably, the laser is pulsed in the nanosecond (ns) range or faster. Preferably, a laser pulse energy of greater than or equal to about 10 millijoules per square centimeter ($mJ/cm^2$) per pulse is employed for vaporization of the sensing element. The laser power density (energy per area) is preferably selected to be close to the ablation threshold of the sensing material. The irradiation time is sufficient to vaporize the sensing material and/or substrate material. For trimming one sensing element, irradiation time may be about 60 seconds to about 600 seconds. The trimming device 200 preferably includes sufficient control processing to allow the device to measure resistance in the sensing element material during the trimming process, to accept a first desired resistance value, and to trim to a desired overshoot value. The trimming device 200 then ablates the sensing element material to meet the desired resistance value.

For example, the laser-trimming device 200 can be a diode-pumped Nd:YAG laser with a 300 mJ/pulse at a frequency of 10 Hz. A laser wavelength can be about 1 micrometer to about 100 micrometers, with a wavelength of about 1 micrometer to 50 micrometers preferred, and a wavelength of about 1 micrometer to about 20 micrometers more preferred.

In various embodiments, the trimming device 200 may also generate a laser-ablated plume of neutral atoms and ions of substrate material. Laser energy sufficient to vaporize the substrate, while avoiding melting the substrate material, is desired. As material is ablated, the plume expands into the near vicinity and re-deposits upon the sensing element as a modified protective coating (e.g., an aluminide-silicide protective coating). It is noted that the protective layer may vary with the substrate material composition. As such the term "modified" is being used herein to account for various other materials that may be present in the protective coating. Moreover, it is noted that in various embodiments the protective coating may be an aluminide, a silicide, a modified aluminide, a modified silicide, or a mixture comprising at least one of the foregoing. In other words, the substrate material is deposited on the sensing element material directly adjacent to the vaporized sensing element and substrate materials to form the protective coating.

Preferably, the protective coating has a thickness of about 2 nanometers (nm) to about 2,000 nm, with a thickness of about 10 nm to about 300 nm preferred. The laser ablating may include a first stage and a second stage. The first stage ablates sensing element material at a first laser power and the second stage ablates substrate material at a second laser power. The laser power used at the first stage can be the same or different than the laser power used at the second stage. The laser can be continuous or pulsed at a repetition rate, e.g., about 1 Hz to about 60 Hz. The laser radiation for ablation of substrate materials can be about 200 mJ/pulse to about 800 mJ/pulse. The wavelength can be tunable to about 400 nm to about 2000 nm. Preferably, the plume includes primarily gas phase materials.

The trimming device 200 is utilized to cut a pattern in the sensing material to produce the sensing element (e.g., 110) having an elongated configuration such as the serpentine pattern 122 illustrated in FIG. 2. In order to attain these patterns, the process is capable of attaining the desired pattern while making greater than or equal to about 10 cuts into the sensing element material, with greater than or equal to about 15 cuts possible, and greater than or equal to about 18 cuts made during the first ablating process preferred, e.g., in automotive temperature sensor applications. The trimming process is employed to increase the resistance of sensing element material to the inputted resistance value.

In one embodiment of making a temperature sensor, in order to avoid the inherent cost of producing a precisely controlled thin film print of conductive material, the method disclosed herein preferably employs a thick film deposition process or similar thick material deposition process either in the form of a pad on a substrate or a rough patterned configuration (not shown). The term thick film as used herein is considered to be material having a nominal thickness greater than or equal to about 2 micrometers in thickness, with a thickness of about 1.8 micrometers to about 4 micrometers of annealed Pt preferred. If a sputter process is utilized, about 2.9 micrometers of platinum oxide is deposited, which after annealing amounts to about 2 micrometers of platinum.

For example, in the thick film method of making the temperature sensor, the sensing element material is disposed on a green (un-fired) substrate 12. The sensing element material is disposed on the substrate 12 at a thickness sufficient to obtain the desired resistance after trimming. When a green substrate 12 is used, it is preferably fired (i.e., heated at a temperature and for a period of time sufficient to densify the material subsequent to the deposition of the sensing element material and leads 14, 16 on the substrate 12). For example, the substrate 12, sensing element material, and leads 14, 16 are preferably fired at a temperature greater than or equal to about 1,300° C. for a period of time greater than or equal to about three hours.

It is noted that significantly more heat is absorbed by the temperature sensor 50 produced from thick film process, because significantly more sensing element material has to be ablated in the process compared to the other laser trimming methods for devices meant for non-temperature varying resistance measurements. One of skill in the art will recognize that laser ablation of a pathway through the sensing element film of greater than or equal to about 100 millimeters (mm) in length is unusually large and will generate significant quantities of heat compared to traditional laser ablation techniques (i.e., ablation of less than or equal to 10 mm of material). In the method disclosed herein, about 50 mm to about 300 mm of length of sensing element material may be ablated, with ablation of about 100 mm to about 250 mm of material length preferred. Generally, laser trimming methods remove (ablate) a length of less than or equal to 10 mm of sensing material. As such, the method disclosed herein differs greatly from traditional methods in both the amount of material being ablated and the relatively high amount of heat absorbed by the sensing material.

Compensation for thermal change in the resistance of sensing element material is accomplished by determining a resistance overshoot and adjusting the trimming process according to the overshoot. Resistance overshoot is a function of the thermal coefficient of resistance of sensing element material, the target resistance, and the temperature rise during ablation. Resistance overshoot is represented, for example, by the following equation:

$$\text{Resistance overshoot} = TCR \times \text{Target Resistance} \times \text{Temperature Rise};$$

where:
TCR=Thermal Coefficient of Resistance
Target Resistance=Desired resistance of sensing element material
Temperature rise=$f_n$(Pulse Duration, Pulse Frequency, Laser Power, Path Length, Step Size, Specific Heat of Substrate, and Mass).

The temperature rise is a function of: pulse duration, pulse frequency, and power of the laser; path length and step size; specific heat, mass, and thermal conductivity of substrate 12; and thickness and abated particle size of sensing element material. Temperature rise is represented, for example by the following equation:

$$\text{Temperature Rise} = A(\text{Pulse Duration} \times \text{Pulse Frequency} \times \text{Laser Power} \times \text{Path Length/Step Size})/(\text{Specific Heat of Substrate} \times \text{Mass}),$$

where:
A=a constant determined empirically for a particular sensor material as a fn(Thermal Conductivity of Substrate, Ink Thickness, and Ink Abated Particle Size).

A measurement circuit is connected to the sensing element and the voltage across the sensing element measured during the trimming process. The mentioned parameters are measured during trimming, the resistance overshoot is determined, and the trimming process is adjusted accordingly to compensate for the thermal change in the resistance of sensing element material such that the desired resistance value is realized.

Following the first trimming operation (e.g., after greater than or equal to about 10 cuts having a total length of greater than or equal to about 100 mm), temperature sensor 50 may be re-fired (i.e., heat treated) to anneal the platinum from the laser processing and burn out small particles left from previous processing. The re-firing process reduces resistance of the sensor element material by about 5%. Re-firing is achieved by subjecting ablated, fired sensor 50 to an elevated temperature of about 1,000° C. to about 1,600° C. for a sufficient period of time, e.g., about one hour to about fifteen hours.

Figure 4:
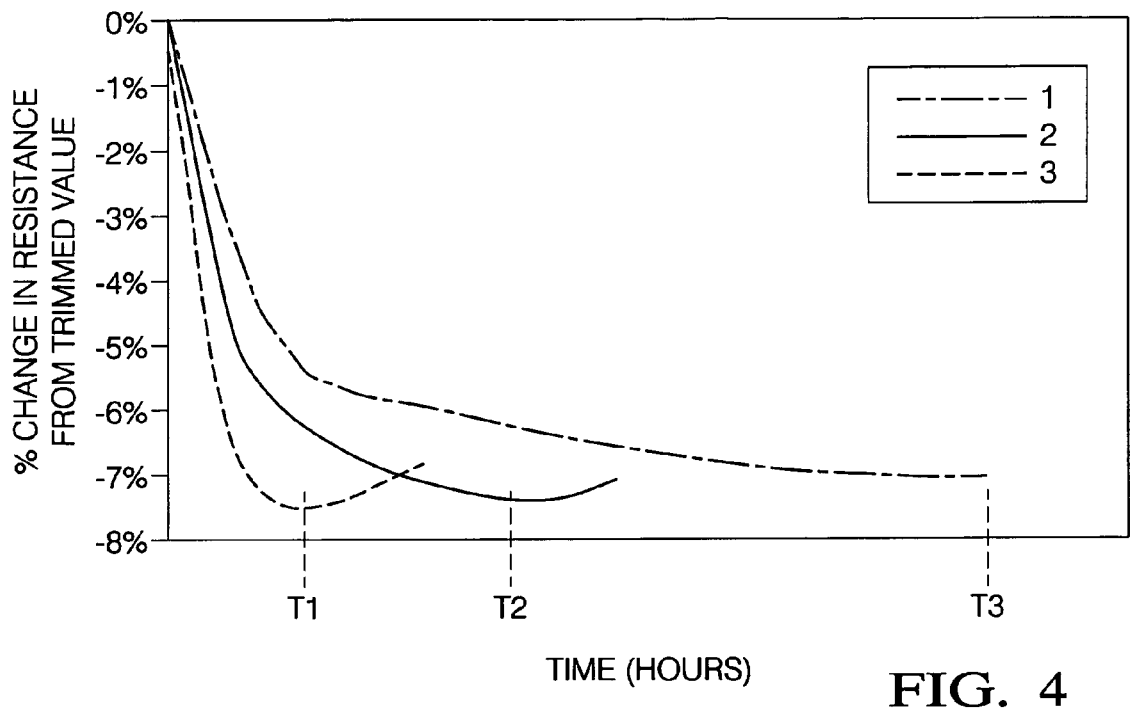
FIG. 4 is a graphic representation of resistance change over time in a re-firing process.

In one embodiment, a selected temperature is maintained for a period of time commensurate with an inflection in a plot where the Y-axis is change in resistivity and the X-axis is time, as illustrated in FIG. 4. Resistivity decreases with time until an inflection point is reached, after which resistance will rise due to vaporization and void formation of the material 12. A first firing temperature 1, for example, is utilized until an inflection point is reached at T1. Firing temperatures are generally about 1,100° C. to about 1,300° C. Determination of the exact point of inflection is made by monitoring resistance at a particular set point. Vaporization of sensing material 10 is difficult to control leading to the teaching herein to terminate the re-firing process at the point of inflection on the relevant curve, indicated by selected re-firing temperature.

After re-firing, temperature sensor 50 may be subjected, e.g., in trimming device 200, to a subsequent (e.g., fine) trimming process in which a further amount of sensing element material 10 is laser ablated in order to obtain the desired resistance value, e.g., in view of resistivity lost during re-firing or to otherwise enhance the first trimming. During the subsequent trimming process, one or more cuts can be employed to cut a length of about 5 mm to about 15 mm more of material.

It has been discovered that a protective coating (e.g., a modified aluminide-silicide) may be deposited over the trimmed portion 122 of sensing element 110 as part of and/or subsequent to the trimming process. When the coating is formed as part of the trimming process, the intensity of laser 8 may optionally be adjusted to vaporize both the sensing element material and at least a portion of the underlying substrate. For example, a platinum sensing material and at least a portion of an underlying substrate (e.g., a substrate comprising alumina, silica, and frit) can be vaporized as part of the trimming process (e.g., the initial ablation and/or subsequent ablation). The vaporized platinum, alumina, silica re-deposit onto the sensor in the area adjacent to the cut, i.e., the trimmed portion 122, thereby resulting in a platinum aluminide-silicide protective coating over the trimmed portion 122 of platinum sensing element 110. Advantageously, the platinum aluminide-silicide coating reduces the thermal aging effects on the sensing element 110. For example, the platinum aluminide-silicide coating can inhibit the platinum sensing element 110 from grain growth, spalling, grain growth, pore coalescence/nucleation, and formation of voids or pinholes, thereby extending the useful life of the temperature sensor.

In other embodiments, instead of cutting into the substrate, the protective coating can be formed by vaporizing, from a secondary source (target), the desired material, e.g., aluminum oxide. In other words, the trimming process may be carried out with or without vaporizing a portion of the substrate 12. In this embodiment, a separate laser may be employed to vaporize a target (e.g., aluminum oxide) located away from the trimmed portion 122. This target is located within close proximity from the trimmed portion 122 such that a platinum aluminide-silicide coating may be formed on the sensing element 110.

Additionally, it is noted that other material(s) may be included in the protective coating. Preferably, these other materials are selected to enhance various properties of the protective coating. The mixed coatings have improved resistance to developing cracks, oxidation, and corrosion compared to un-mixed coatings. The mixed coatings may be made from additional elements present in the substrate body. Those elements can be co-vaporized and co-deposited with the aluminum oxide. For example, yttrium may be included in the substrate such that co-deposition of yttrium in the aluminide-silicide coating improves resistance to high temperature hydrogen induced vaporization of the platinum electrode. For example, the deposited aluminide-silicide can comprises about 2 atomic percent (at. %) to about 20 at. % yttrium oxide ($Y_2O_3$). The formed coatings may comprise yttrium-silicide rich regions and aluminide rich regions. The yttrium modified aluminide-silicide protective coating has improved reduction and hot reducing gas corrosion resistance of sensing element 110, particularly at temperatures above 1,000° C. Preferably, the yttrium content of the protective coating is less than or equal to about 20 at. %, more preferably less than or equal to about 16 at. % and most preferably less than or equal to about 12 at. %.

Further, vaporized substrate materials such as barium and strontium also may be incorporate into the aluminide-silicide protective coating, thereby further improving the structural durability of the protective coating. It is noted that these additional materials are included herein merely as examples. Other materials may be included in the substrate such that vaporization and co-deposition with the aluminide-silicide protective coating to impart other desirable properties.

In other embodiments, these additional materials may be incorporated into the protective coating by laser vaporizing of a secondary target(s) and co-depositing these materials onto the sensing element 110. The vaporized materials may then be deposited at least onto the remaining sensing element material disposed adjacent the cut (i.e., the cut that vaporized the material). The location and depths of the cuts are preferably such that the majority of the remaining sensing element material is coated with the protective coating, with greater than or equal to about 90% of the remaining sensing element material surface area is coated with the protective coating preferred, greater than or equal to about 95% of the remaining sensing element material surface area coated with the protective coating more preferred, and greater than or equal to about 99% of the remaining sensing element material surface area coated with the protective coating even more preferred. In order to attain the desired coating coverage, the laser cuts can be sufficiently close together such that the vapor deposited onto the remaining sensing element material covers greater than or equal to 99% of the material between adjacent cuts. In an automotive temperature sensor application, for example, all remaining sensor element material can be within a distance of less than or equal to about 50 micrometers of a cut, with a distance of less than or equal to about 35 micrometers of a cut desirable, and less than or equal to about 20 micrometers of a cut even more desirable.

While these techniques have been discussed above in relation to the trimmed portion 122, these disclosed techniques may also be used to attain a protective coating on the margin 120 of sensing element 110. For example, the laser may be used to create cuts in the margin. Alternatively, a secondary target of silicon nitride ($Si_3N_4$) or silicon dioxide ($SiO_2$) may be vaporized and deposited over the margin 120 as discussed above with regard to trimmed portion 122. Accordingly, grain growth and pore coalescence/nucleation in the margin may be inhibited, which can result in extending the life of the temperature sensor as discussed above.

The temperature sensor may comprise an additional protective layer or a cover plate over the sensing element (10, 110). For example, a dense ceramic layer may be disposed over the sensing element (10, 110). The ceramic layer may be disposed, e.g., by glass sealing a ceramic cover plate, plasma spraying a ceramic, thick film deposition, and co-firing of a glass-ceramic, ant the like. The ceramic layer may comprise a spinel such as magnesium aluminate, a glass, a glass ceramic or any of the materials described for the substrate 12. Generally, the materials are selected to prevent impurities, such as phosphorus, calcium, zinc, iron, copper, lead, silicon, manganese, and the like, from permeating the layer and interfering with the operation of the sensing element. These metals also may react with and transport through the aluminide-silicide protective coatings, forming for example, copper silicide and a contaminated (e.g., changed TCR) copper-sensing element. The use of the optional cover plate over the protective coating in the sensing element can yield a higher quality, more durable, and more reliable isolative properties compared to a configuration of an aluminide-silicide protective coating alone.

Figure 5:
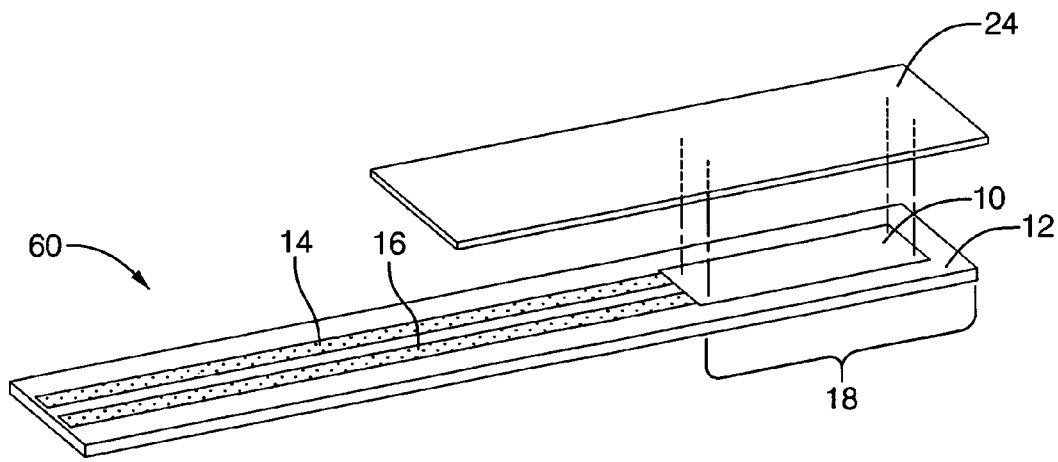
FIG. 5 is a perspective schematic representation of another embodiment of a temperature sensor.

Referring now to FIG. 5, a temperature sensor generally designated 60 comprises a ceramic cover plate 24. The cover plate 24 is disposed over the sensing element 10 at least at the sensing end 18, and is physical contact with at least a portion of the substrate 12. The assembly comprising the cover plate 24 may be glass sealed to the sensor 60 by applying a glass bead on the substrate 12, but not touching sensing electrode 10. The assembly comprising the cover plate 24 may then be fired at a temperature and for a period of time sufficient to melt the glass and attach the cover plate 24 onto the substrate 12.

The glass layer is preferably made of high bond strength glass with a melt temperature greater than or equal to about 800° C., with a melt temperature of greater than or equal to about 1,000° C. preferred, and a melt temperature greater than or equal to about 1,200° C. more preferred. Further, the glass is preferably a high dielectric glass comprising about 45 to about 70 mole percent (mol. %) $M^{+4}$ metal oxide, 1 to about 25 mol. % $M^{+3}$ metal oxide, and 10 to about 26 mol. % $M^{+3}$ rare earth oxide. Examples of $M^{+4}$ metal oxides include $SiO_2$, $TiO_2$, $ZrO_2$, $HfO_2$, $GeO_2$, $SnO_2$, and $PbO_2$. Examples of $M^{+3}$ metal oxides include $Sc_2O_3$, $Y_2O_3$, $B_2O_3$, $Al_2O_3$, $Ga_2O_3$, $In_2O_3$, $Sb_2O_3$ and $Bi_2O_3$. Examples of $M^{+3}$ rare earth oxides include $La_2O_3$, $Ce_2O_3$, $Nd_2O_3$, $Sm_2O_3$, $Gd_2O_3$, $Dy_2O_3$, $Ho_2O_3$, $Er_2O_3$, $Yb_2O_3$, and $Lu_2O_3$.

Figures 6, 7:
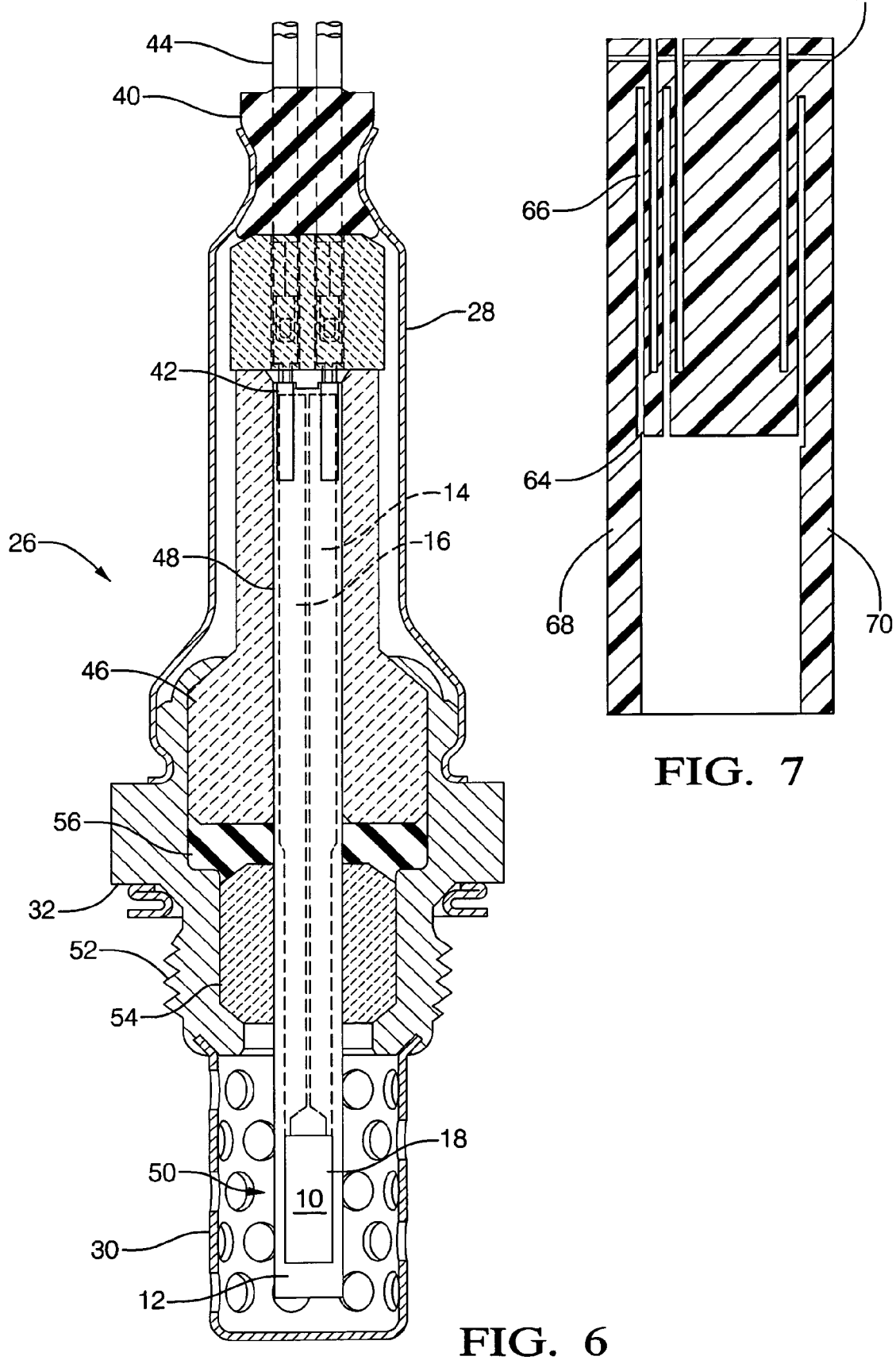
FIG. 6 is a cross sectional view of an embodiment of a packaged temperature sensor.
FIG. 7 is a schematic illustration of a sensing element.

To allow the temperature sensor (e.g., 50) to be used in measuring a temperature of a gas, the temperature sensor 50 is preferably disposed within a package to produce a packaged temperature sensor 26. Referring to FIG. 6, temperature sensor 50 is disposed within a housing structure generally formed of an upper shield 28, a lower shield 30, and a shell 32. A terminal connector 40 and a portion of temperature sensor 50 are disposed within the upper shield 28. Terminals 42 contact external pads, preferably using spring terminals, to provide electrical connection between electric wires 44, and temperature sensor 50. The use of spring terminals disposed on the end of the temperature sensor 50 also assists in securely maintaining electrical contact therewith. The inner insulator 46 disposed within upper shield 28 has a centrally located annular opening 48 sized to allow insertion of temperature sensor 50 therethrough.

Shell 32 includes a body portion preferably shaped to accommodate a wrench or other tool for tightening a threaded portion 52 into a mount for an exhaust pipe or other component of an exhaust flow system to enable a sensing end 18 of temperature sensor 50 to be located within a flow of material to be sensed (e.g., the measurement of an exhaust gas temperature). Preferably, shell 32 is coupled to upper shield 28 by being crimped thereto during the assembly process. Accordingly, shell 32 holds inner insulator 46 in a compressive force engagement. Also disposed with shell 32 is lower insulator 54 through which sensing end 18 of temperature sensor 50 is located. Disposed between inner insulator 46 and lower insulator 54 is a layer of inert sealing material 56, preferably comprising talc, magnesium oxide, and the like.

EXAMPLE 1

Platinum leads were screen printed onto an alumina substrate and fired in an oven for greater than or equal to about 3 hours at 1,300° C. Then the alumina substrate was placed in a plasma vapor deposition (sputter) chamber and a platinum oxide was deposited 2.9 micrometers thick onto the alumina substrate. After the platinum oxide was deposited, it was annealed in an oven for 10 hours at 1,000° C. reducing the coating to substantially pure platinum. The substrate was then placed in a laser trimming device, one as previously described, and the resistance of the sensor element was measured. The starting resistance was about 2 ohms, including the lead resistance. The resistance was continuously measured during the entire lasering process. Reference is made to FIG. 7 to better illustrate the process. A horizontal isolation cut 62 was first made near the top edge of the substrate near the sputtered end of the sensing element. This isolation cut 62 defined the exact end of the sensing element. Then the laser was positioned at its starting point 64 and a vertical cut 66 was made along the left edge of the sensing portion of the substrate near the leads (68, 70). The cut was made from the starting point of the platinum sputter all the way to the horizontal isolation line minus about 500 micrometers. The vertical line length was on the order of 10 mm for each cut depending on the geometry of the substrate being trimmed. The laser was stopped, indexed to the right 0.003 inches (about 0.08 mm) and moved above the horizontal isolation line. The laser was again started and descended vertically back towards the starting point minus about 500 micrometers from the start of the sputter. This series of cuts created the serpentine pattern and was continued until the coarse target resistance was achieved, generally about 18 to about 24 vertical lines for a total cut length of around 200 mm. The pattern was thus made using laser ablation of platinum instead of the use of etching to remove the platinum. It is noted in FIG. 7 that only a few cuts are illustrated to better illustrate the starting position of the coarse trim and the starting point for the fine trim.

The coarse trim target resistance is dependent on the type of laser used, number of elements trimmed at the same time as well as the other variables previously mentioned. In the process used in this example, the target resistance was determined under room temperature conditions (i.e., about 20° C.) to be a nominal 242 ohms for the parameters set. It is noted that the laser program will modify this resistance using the calculations previously mentioned if there is a greater or lesser amount of energy being used than the nominal (i.e., taking a longer or shorter line length to meet the desired target due to material or process variation). After cooling, the measured resistance was about 230 ohms in room temperature (for a final target resistance of 200 ohms at 0° C.).

The coarse trimmed sensor was then heat treated in an oven to anneal the platinum that might have been stressed during the lasering operation. The sensing element was annealed at about 1,100° C. for 0.5 hours reducing the room temperature resistance down to about 216 ohms.

The sensor was then returned to the laser for the fine trim operation. This time the lasering beings on the right side and travels to the left so as to not interfere with the previous coarse trimming operation. The cut procedure is the same as previously discussed for the coarse trim. The final target value of 218 ohms at room temperature was achieved after cool down by trimming to the target value, which was again determined by the previously mentioned calculation. For a pre-fine trimmed sensor at 216.00 ohms, the calculations on the setup used might call for a target resistance of 219.80 ohms so that the cooled down resistance will be 218.00 ohms at room temperature and 200.00 ohms at 0° C.

EXAMPLE 2

An alumina tape (substrate) was created with 95.16 wt. % alpha-alumina and 4.84 wt. % frit, based on the total weight percent of the alumina tape. The frit comprised 60 mol. % $SiO_2$ (29.7 wt. %), 20 mol. % $Al_2O_3$ (16.8 wt. %), and 20 mol % $La_2O_3$ (53.5 wt. %). A material comprising 475.8 grams alpha-alumina powder, 24.2 grams of frit powder, 120 grams of xylene, 120 grams of ethanol and 7.0 grams of menhaden fish oil (a dispersant and release agent) were added to a high purity alpha-alumina lined ball mill. The material was milled with high density (e.g., a density greater than or equal to about 99.8%), high purity alpha-alumina (e.g., less than or equal to 0.05 wt. % impurities, based on the total weight of the alumina), $\frac{1}{8}^{th}$ inch diameter mill balls for 12 hours. Next, 64 grams of ethanol, 64 grams of xylene, 53.1 grams of Butvar B98 and 33 grams of Sanitizer 160 were added and the mixture was milled for an additional 4 hours.

The milled mixture was tape cast on non-silicone coated Mylar film using a doctor blade to form a flexible polymer tape. The tape was removed from the Mylar and cut into 3.0 inch (about 7.6 cm)×2.0 inch (about 5.08 cm) rectangles. Seven of the 3.0 inch (about 7.6 cm)×2.0 inch (about 5.08 cm)×0.008 inch (about 0.2 cm) "green" tape layers were laminated for 15 minutes at a temperature of 90° C. and a pressure of 3,500 psi (about 24,132 kPa). The laminated single monolithic structure was cut to pieces 3.00 inch (about 7.6 cm)×2.00 inch (about 5.08 cm)×0.056 inch (about 0.14 cm). The laminated "green" pieces were fired at 1,510° C. for 2 hours. The sintered substrate layer was 2.49 inch (about 6.3 cm)×1.66 inch (about 4.2 cm)×0.032 inch (about 0.08 cm).

The sintered alpha-alumina substrate was then sputtered. The target used in the sputter deposition was a hot pressed powder target. The deposition employed a hot substrate, i.e., in-situ deposition and annealing.

A platinum layer was deposited onto the substrate using magnetron sputtering of a platinum target. The thickness of the substrate was about 400 micrometers. The deposited platinum layer was about 2,000 nm. The platinum-substrate was annealed at 850° C. for a period of 4 hours under ambient pressure.

A Nd:YAG laser (GSI LUMONICS W670 Thick Film Laser Trim System) operating with an unfocused, output wavelength of 1,064 nm and pulse width of 15 nanoseconds was used to irradiate the platinum layer deposited upon the substrate. Irradiation of the platinum-substrate with the 1,064 nm unfocused output of a Nd:YAG laser operating at 300 mJ per pulse and a repetition rate of 10 kHz for 2 min was enough to separate into individual segments. The laser power was about 130 mJ/pulse, the repetition rate was about 10 kHz and the substrate temperature was about 60° C. The vaporized platinum, aluminum oxide, and silicon dioxide were re-deposited over the platinum layer as platinum aluminide-silicide. The deposition rate was about 50 nm/min and the deposited platinum aluminide-silicide layer was about 14 nm thick.

EXAMPLE 3

Eighteen electric lead patterns were screen printed through a 1.0 mil screen (25 micrometers) onto a substrate 90 mm×90 mm×0.5 mm comprising 94 wt. % alumina, 2 wt. % silica and 4 wt. % frit, wherein the weight percent is based on the total weight of the substrate. The substrate was fired to 1,300° C. over a 6 hour period, held at 1,300° C. for 6 hours, and cooled to room temperature over a 1 hour period. The fired thickness of the lead patterns was 0.5 mil (12.5 micrometers). Platinum oxide was sputter deposited over one end, covering a 25 mm×90 mm area. The thickness of the deposited thin sputtered film of platinum oxide was 4.6 micrometers. The sputtered platinum oxide was annealed for 10 hours at 1,000° C. using argon as the working gas. The resulting thickness of the annealed thin sputtered film of platinum was 1.8 μm.

Figure 8:
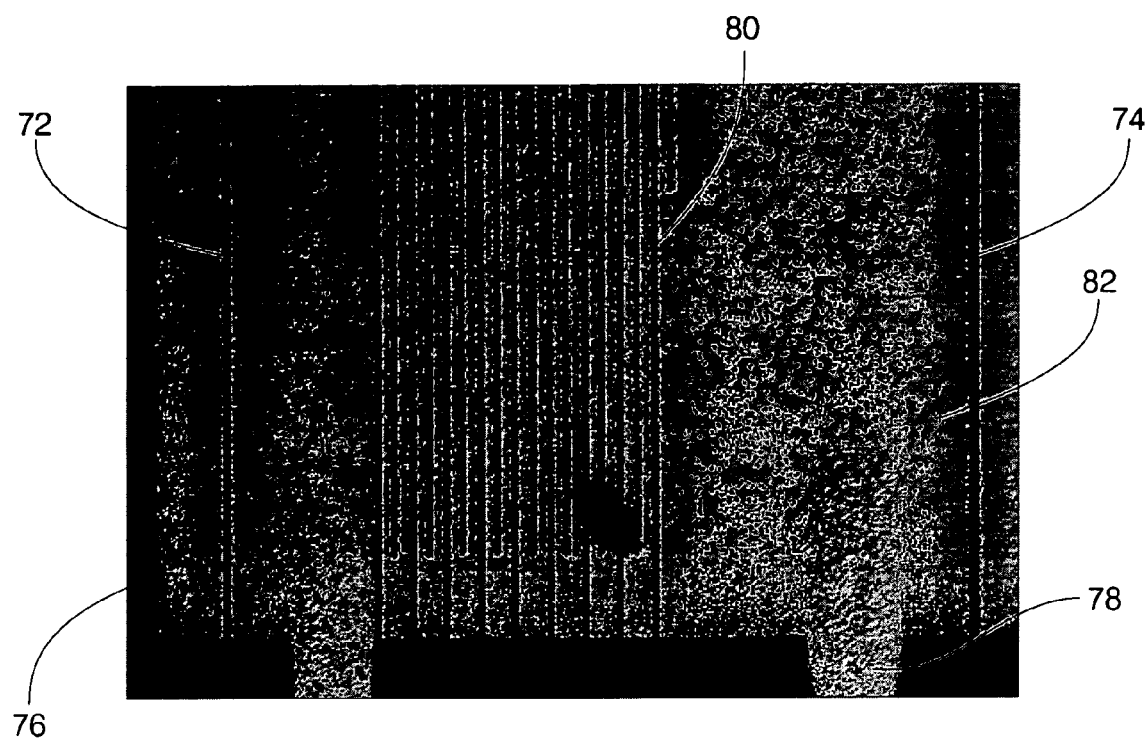
FIG. 8 is a scanning electron microscope (SEM) image of a sensing electrode exposed to 1,300° C. without a protective coating.

Chemical composition of the platinum film was measured by a Hitachi S-3200N Scanning Electron Microscopy with Energy Dispersive X-ray Spectrum (SEM-EDX). An accelerating voltage of 25 kV was used for both imaging and composition analysis. FIGS. 7 and 8 illustrate samples that were analyzed using a magnification of 30×, a working distance of 21 mm, and a vacuum pressure of 15 Pa (pascals).

Figure 9:
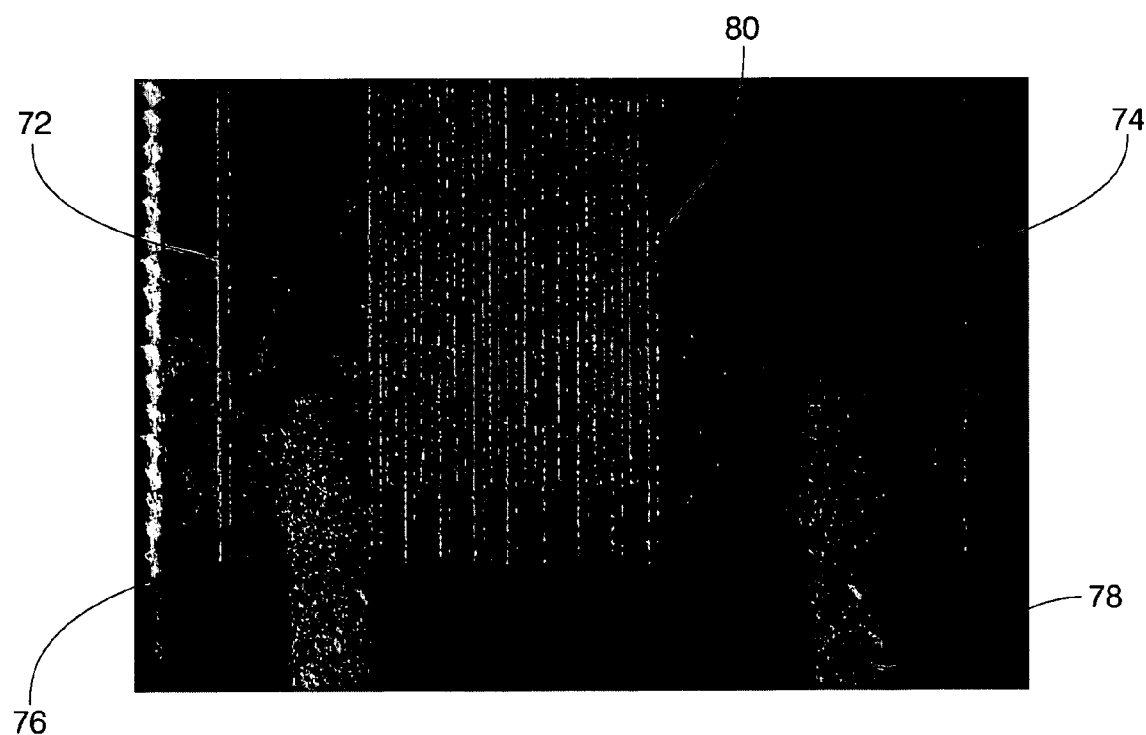
FIG. 9 is an SEM image of a sensing electrode exposed to 1,300° C. with a protective coating.

Referring to FIGS. 8-9, the laser cut (72) at about 0.4 mm from the left side of the image to the laser cut (74) about 0.25 mm from the right side of the image are the cuts that go fully through the substrate, segmenting the substrate into individual sensor elements. The individual sensor is 3.3 mm wide after laser segmentation. Coming in from the bottom of FIG. 8 and FIGS. 9 images are the screen-printed electric leads (76 and 78). The left side of the left electric lead 76 begins at about 0.7 mm from the left side of the image and ends at about 1.1 mm from the left side of the image, i.e., the electric lead is about 0.4 mm wide. Beginning at about 1.1 mm from the left side of the image and ending at 2.35 mm from the left side of the image are 18 laser scribes (80) through the sputtered platinum oxide/annealed platinum metal sensing element. The distance from the bottom edge of image to the beginning of the platinum metal sensing element is about 0.8 mm. Although it is not fully shown in the image, the distance from the beginning of the platinum metal sensing element to the end of the beginning of the platinum metal sensing element, along the scribe axis, is about 11.7 mm. The first laser scribe begins at 0.0 mm from the bottom edge of the platinum metal sensing element and extends 11.3 mm, i.e. about 0.4 mm short of the top edge (not shown). The second laser scribe begins at 0.4 mm from the bottom edge of the platinum metal sensing element and extends 11.3 mm to the top edge (not shown). The 17 full laser scribes, each about 11.3 mm and the 18$^{th}$ laser scribe about 9.0 mm make the total laser scribe distance about 201.1 mm.

Furthermore, FIG. 8 illustrates a sensing element that has been exposed to 1,300° C. without a protective coating (e.g., aluminide-silicide). The formation of voids and/or pinholes (82) is observed in the SEM illustrated in FIG. 8. In comparison to FIG. 8, no voids and/or pinholes are observed in the SEM illustrated in FIG. 9, which is for a sensing electrode that has been exposed to 1,300° C. with a protective coating (e.g., aluminide-silicide).

Advantageously, the methods disclosed herein offer a number of improvements over other methods for making temperature sensors. For example, some of the methods described above allow an accurate temperature resistance to be obtained while using a thick film sensing element material. As such, the process time to make a temperature sensor can be reduced compared to traditional methods, thereby reducing processing costs. Additionally, embodiments disclosed herein can comprise an aluminide protective coating that can inhibit grain growth and pore coalescence/nucleation in the sensing element material, thereby extending the life of the temperature sensor.

Traditionally, in the formation of a temperature sensor, only etching was used to remove the deposited platinum, the entire combined laser cut lengths for the sensing element totaled about 10 mm or less, did not distribute the protective aluminide coating over the entire effective sensing portion of the sensor.

Temperature sensors formed in accordance with the methods disclosed herein, in contrast, have combined laser cut lengths of greater than or equal to about 50 mm (with greater than or equal to about 150 mm typical), and/or comprising the protective aluminide coating over the entire effective sensing portion of the sensor. Further, by using the laser to remove all of the required platinum from the sensing portion of the substrate, the processing time is reduced from the traditional etching platinum removal technique.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A planar temperature sensor comprising:
   a substrate;
   a sensing material disposed on the substrate, wherein the sensing material comprises a metal selected from the group consisting of platinum, rhodium, and palladium;
   a protective coating disposed on at least a portion of the sensing material, wherein the protective coating comprises an aluminide or silicide compound containing the metal.

2. The planar temperature sensor of claim 1, wherein the protective coating further comprises an additional material selected from the group consisting of yttrium and zirconium.

3. The planar temperature sensor of claim 2, wherein the protective coating has a thickness of about 2 nm to about 20 nm.

* * * * *